(12) United States Patent
Lim et al.

(10) Patent No.: US 10,414,609 B2
(45) Date of Patent: Sep. 17, 2019

(54) AUTOMATIC DOCUMENT FEEDER

(71) Applicant: Hewlett-Packard Development Company, L.P., Houston, TX (US)

(72) Inventors: Sean B S Lim, Singapore (SG); Lim Cheng Woon, Singapore (SG); Praveen Francis, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 26 days.

(21) Appl. No.: 15/546,758

(22) PCT Filed: Apr. 7, 2015

(86) PCT No.: PCT/US2015/024734
§ 371 (c)(1),
(2) Date: Jul. 27, 2017

(87) PCT Pub. No.: WO2016/163997
PCT Pub. Date: Oct. 13, 2016

(65) Prior Publication Data
US 2018/0027137 A1    Jan. 25, 2018

(51) Int. Cl.
*B65H 7/20* (2006.01)
*B65H 5/00* (2006.01)
(Continued)

(52) U.S. Cl.
CPC ............. *B65H 7/20* (2013.01); *B65H 5/00* (2013.01); *B65H 7/02* (2013.01); *G03G 15/00* (2013.01); *G03G 15/602* (2013.01); *H04N 1/0075* (2013.01); *H04N 1/00588* (2013.01); *H04N 1/00602* (2013.01); *H04N 1/00734* (2013.01); *H04N 1/00745* (2013.01); *H04N 1/00782* (2013.01); *B65H 2301/544* (2013.01);
(Continued)

(58) Field of Classification Search
CPC ... B65H 7/00; B65H 7/02; B65H 7/14; B65H 7/20; B65H 2301/544; B65H 2801/39; H04N 1/00782; H04N 1/0075; H04N 1/00734; H04N 1/00745
See application file for complete search history.

(56) References Cited

U.S. PATENT DOCUMENTS 5,564,848 A    10/1996 Quintana
5,852,501 A    12/1998 Maehara et al.
(Continued)

FOREIGN PATENT DOCUMENTS

CN    2427845    4/2001
CN    101424901    5/2009
(Continued)

OTHER PUBLICATIONS

Crawford, et al., "Print Quality Measurements for High-Speed Electrophotographic Printers", IBM J. Res. Develop. vol. 28 No. 3. May 1984, 9 pages.

*Primary Examiner* — Prasad V Gokhale
(74) *Attorney, Agent, or Firm* — Dicke Billig & Czaja PLLC

(57) ABSTRACT

An automatic document feeding system includes an image reader including an optical window and a light source illuminating the optical window, and an automatic document feeder including a reflective flag positioned within a viewing region of the optical window.

14 Claims, 4 Drawing Sheets

(51) Int. Cl.
  *G03G 15/00* (2006.01)
  *B65H 7/02* (2006.01)
  *H04N 1/00* (2006.01)

(52) U.S. Cl.
  CPC ...... *B65H 2553/82* (2013.01); *B65H 2801/03* (2013.01); *B65H 2801/39* (2013.01); *H04N 2201/0081* (2013.01)

(56) References Cited

U.S. PATENT DOCUMENTS

| | | | |
|---|---|---|---|
| 6,523,925 | B1 | 2/2003 | Driggers |
| 7,139,108 | B2 * | 11/2006 | Andersen ............. G03G 15/607 |
| | | | 358/474 |
| 7,308,227 | B2 * | 12/2007 | Ahn .................... G03G 15/6564 |
| | | | 399/388 |
| 8,005,388 | B2 | 8/2011 | Maul et al. |
| 8,054,511 | B2 * | 11/2011 | Aoki .................... H04N 1/4076 |
| | | | 358/408 |
| 8,297,612 | B2 | 10/2012 | Chapman et al. |
| 8,300,280 | B2 * | 10/2012 | Lee .................... H04N 1/00588 |
| | | | 358/474 |
| 8,810,860 | B2 * | 8/2014 | Honda ............... G03G 15/5025 |
| | | | 358/1.15 |
| 2004/0256583 | A1 * | 12/2004 | Hill .................... H04N 1/00681 |
| | | | 250/559.01 |
| 2005/0243382 | A1 * | 11/2005 | Wang ..................... H04N 1/121 |
| | | | 358/461 |
| 2008/0169602 | A1 * | 7/2008 | Shingai .................... B65H 7/02 |
| | | | 271/265.03 |
| 2011/0228349 | A1 * | 9/2011 | Iwayama ........... H04N 1/00718 |
| | | | 358/474 |
| 2014/0168722 | A1 * | 6/2014 | Mitamura .......... H04N 1/00649 |
| | | | 358/474 |
| 2015/0029563 | A1 | 1/2015 | Tao et al. |

FOREIGN PATENT DOCUMENTS

| | | |
|---|---|---|
| CN | 101969522 | 2/2011 |
| CN | 102574648 | 7/2012 |
| JP | 11038800 | 2/1999 |
| KR | 20120062936 | 6/2012 |

* cited by examiner

AUTOMATIC DOCUMENT FEEDER

BACKGROUND

Automatic document feeders (ADF) are often included in printers, scanners, and multi-function devices for automatically loading and unloading single sheets of media, such as paper, sequentially to a functional station where the apparatus performs an operation (e.g., sequentially scanning the fed document sheets for copying, faxing, or displaying on a computer monitor). In an ADF system, detection of leading and trailing edges of the media feeding through it is used so that the system can know when to start and stop scanning. This is typically performed through at least one electronic sensor and a flag. Automatic document feeders typically utilize sensors for detecting the leading edge of a document as the document is withdrawn from an input or supply tray and fed into the scanner. From the point in time that the leading edge is detected, the amount of time to convey the leading edge to the imaging sensor is monitored so that the imaging sensor can initiate actual imaging (scanning) reader at the precise time when the leading edge of the document reaches the imaging reader. This amount of time will be more or less depending on the relative location of the sensor, or sensors, in the ADF document feed path.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
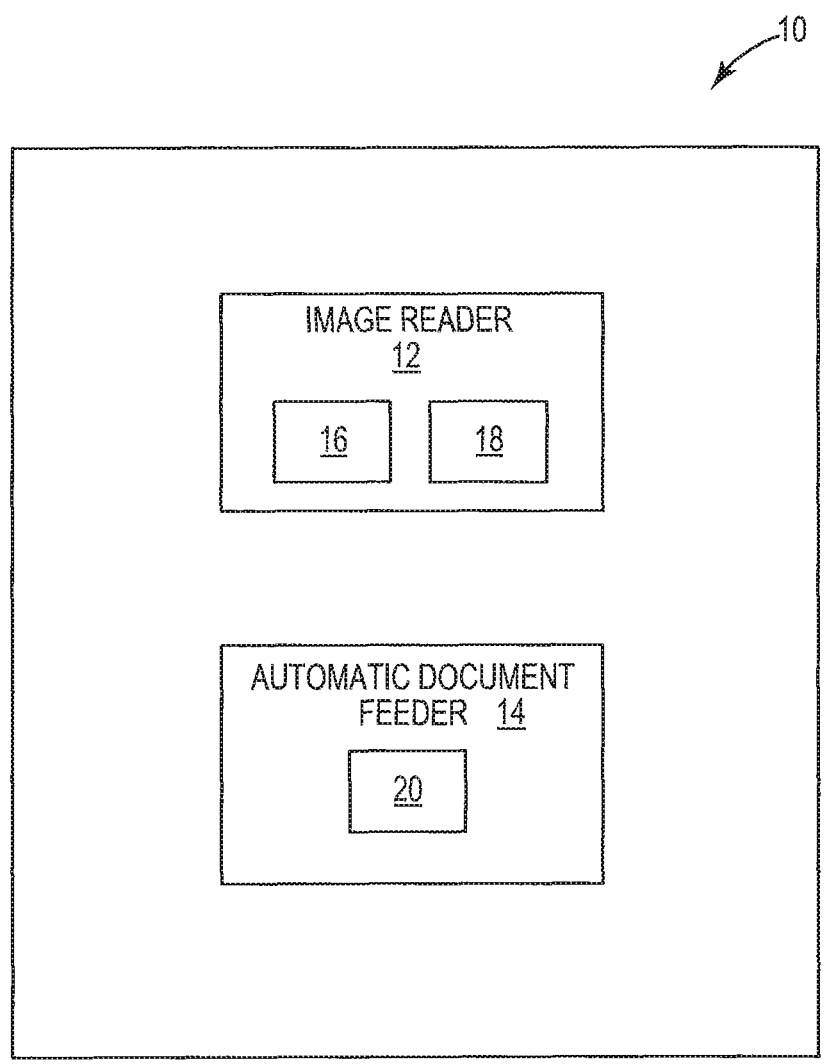
FIG. 1 is a block diagram of an automatic document feeder system in accordance with an example.

An automatic document feeder system 10 for detecting a media edge is illustrated in FIG. 1. Examples of system 10 include an image reader 12 and an automatic document feeder (ADF) 14. In general terms, ADF 14 automatically feeds medium, such as printed documents, for example, page by page through system 10. Image reader 12 reads, or scans, the documents as they pass through system 10. Image reader 12 includes an optical window 16 and a light source 18 illuminating optical window 16. ADF 14 includes a reflective flag 20 positioned within a viewing region 22 of optical window 16. (see, e.g., FIGS. 3A-3B)

Figure 2:
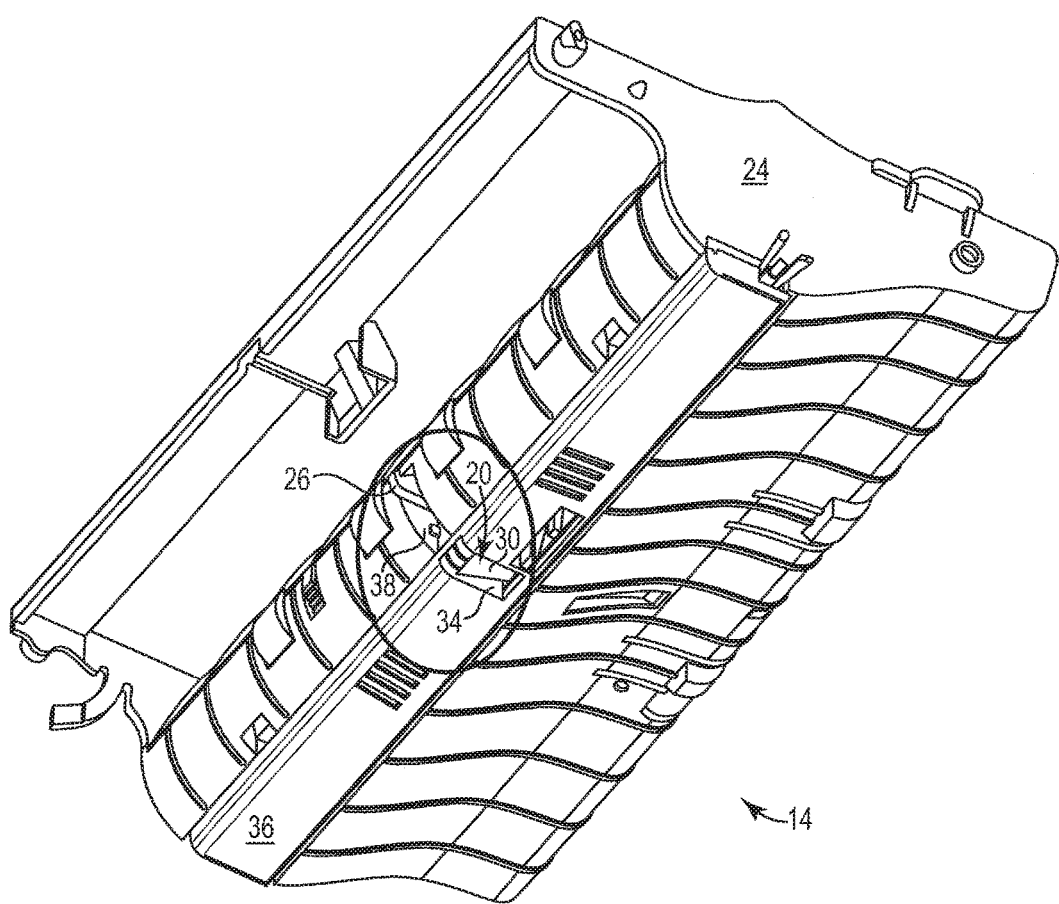
FIG. 2 is perspective view of an automatic document feeder useful in an automatic document feeder system in accordance with an example.

As illustrated in FIG. 2, ADF 14 includes a housing 24. Reflective flag 20 is movable relative to housing 24. With additional reference to FIGS. 3A-3B, reflective flag 20 includes a trigger 26 extending laterally from a pivotal axis 28 of reflective flag 20. A reflective surface 30 of reflective flag 20 is extended from the pivotal axis 28 on an arm 32. Trigger 26 is radially spaced from reflective surface 30 on reflective flag 20. Trigger 26 has a fixed relationship to reflective surface 30. ADF 14 includes an opening 34 in a scroll bar 36. Reflective surface 30 of reflective flag 20 can be viewable to image reader 12 through opening 34 in a standby, or untriggered, state and unviewable to image reader 12 in a triggered state. In one example, a trigger opening 38 is a slotted opening included in housing 24 of ADF 14 directly above opening 34. Trigger opening 38 is sized and shaped to provide for rotation movement of trigger 26 extending partially through trigger opening 38. Opening 34 and trigger opening 38 can both be slotted openings.

Trigger 26 extends through trigger opening 38 into a media path 40 (indicated by a dashed line). Media, such as paper or slides, for example, can have multiple sheets, each having a leading edge and a trailing edge. As media moved by ADF 14 contacts trigger 26, trigger 26 is rotationally moved about pivotal axis 28 by the force of document moved along media path 40. Media moved along media path 40 passes trigger 26 prior to opening 34 and reflective surface 30. Rotational movement of trigger 26 causes reflective surface 30 to similarly rotationally move, notifying system 10 of the upcoming leading edge prior to the leading edge crossing a scan line 42 defined within optical window 16 of image reader 12 as described in more detail below.

Figure 3A:
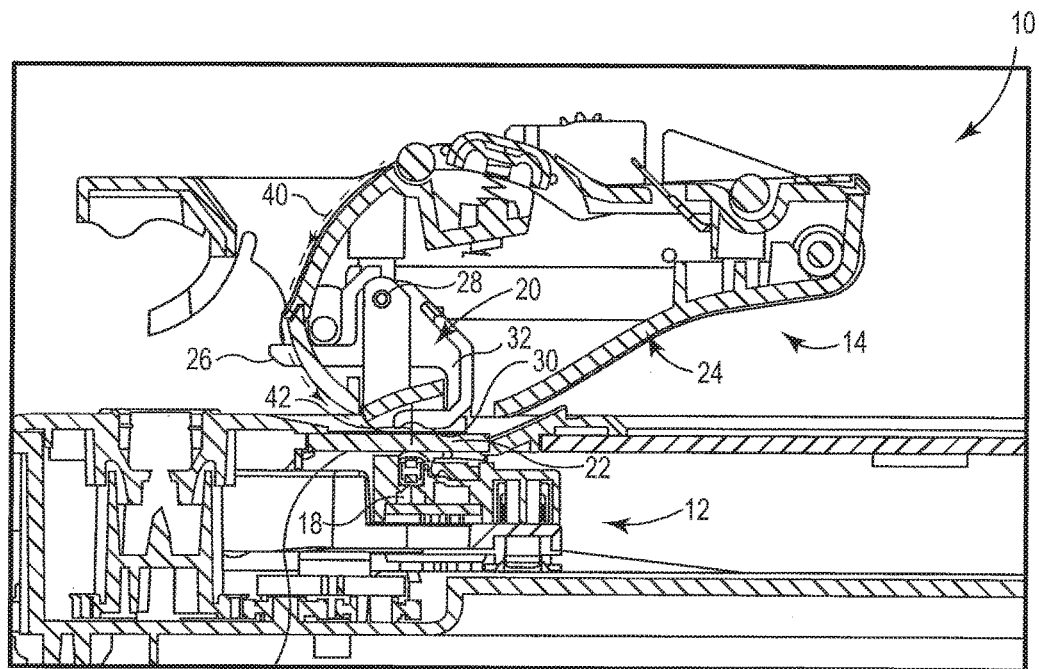
FIG. 3A is cross-sectional view of an automatic document feeder system with a reflective trigger in a standby position in accordance with an example.
Figure 3B:
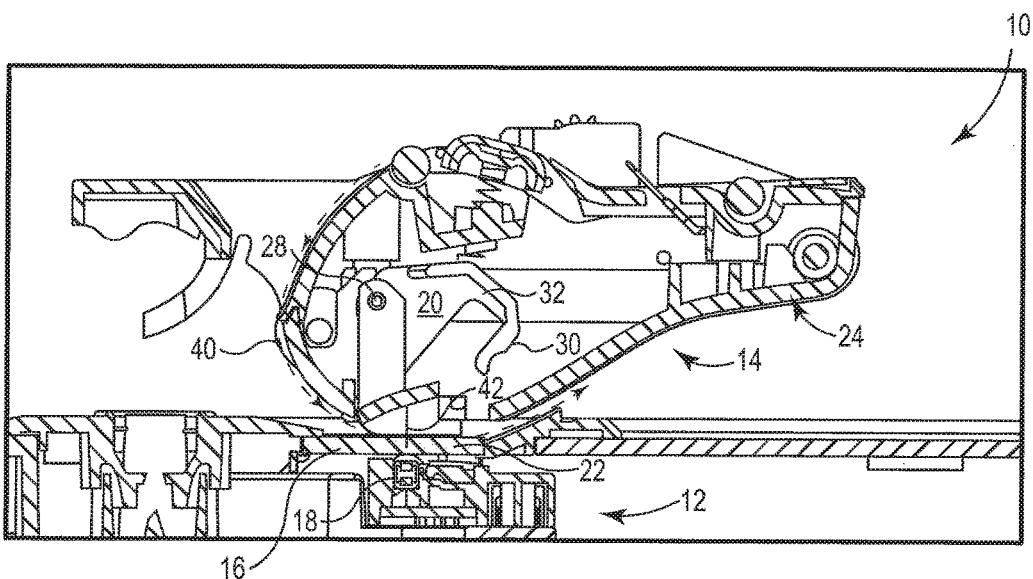
FIG. 3B is a cross-sectional view of the automatic document feeder system of FIG. 3A with a reflective trigger in a triggered position in accordance with an example.

As illustrated in FIGS. 3A-3B, image reader 12 includes optical, or scan, window 16 where ADF-fed media is read, or scanned. Reflective flag 20 is movably positioned adjacent to optical window 16 within viewing region 22. As illustrated in FIG. 3A, reflective surface 30 of reflective flag 20 is positioned directly adjacent optical window 16 in a standby position. As illustrated in FIG. 3B, reflective flag 20 is rotated to position reflective surface 30 away from viewing region 22 of optical window 16 in a triggered position. Reflective surface 30 can be rotatably positioned within housing 24 of ADF 14 in the triggered position.

System 10 includes a single image reader 12 to detect both leading and trailing edges of an automatically fed medium and to scan/read an image on the medium. System 10 positions trigger 26 prior to reflective surface 30 in the media path 40 to detect the leading edge of ADF fed medium and notify image reader 12 of the position and movement of the medium. Movement of the medium across trigger 26 prior to the document crossing scan line 42 provides system 10 time to react and respond as the medium leading edge crosses trigger 26, rotationally moving reflective surface 30 out of the viewing region 22 of optical window 16. In response to reflective surface 30, no longer viewable to image reader 12, system 10 detects when to start scanning prior to the medium edge crossing scan line 42 of image reader 12 and for margins reliability and accuracy. Image reader 12 initiates the scanning process at the precise time the medium reaches optical window 16. Upon the trailing edge of the medium entirely passing trigger 26, reflective flag 20 is rotationally and gravitationally returned to the standby state and reflective surface 30 resumes position in opening 34. As the trailing edge of the medium passes through scan line 42, reflective surface 30 is again exposed to image reader 12 and the scan is terminated. The process is resumed, or continued, as additional medium is fed by ADF 14 through media path 40.

Image reader 12 can be an optical scanner, for example, operated by imaging an object on a medium, such as a sheet of paper, with light source 18, sensing a resultant light signal with an optical sensor array (not shown). Each optical sensor in the array generates a data signal representative of the intensity of light impinged thereon for a corresponding portion of the imaged object. The data signals from the array sensors are then processed (typically digitized) and stored in a temporary memory for subsequent manipulation and printing or display. The image of the scanned object is projected onto the optical photo sensor array incrementally by use of a moving scan line 42. Moving scan line 42 is produced by moving the medium with respect to image reader 12. The medium is moved with respect to the image reader 12 by ADF 14.

The brightness, or light signal, of reflective surface 30 is in contrast to the brightness, or light signal, of other surfaces of reflective flag 20 rotationally viewable to image reader 12 and documents passed through scan line 42. The brightness of reflective surface 30 has higher pixel values in contrast to the medium and other surfaces. Reflective surface 30 provides high contrast definition between a state of medium presence and absence. With the high contrast, the opportunity for erroneous detection of media is reduced and reliability of a scan is improved. Scanning is prompted by the change in average pixel values indicative of the leading edge of the medium to be scanned.

Image reader 12 can be calibrated prior to media being fed through ADF system 10. During calibration, reflective surface 30 is scanned and image data related to the brightness, or light reflectance, value of reflective surface 30 is acquired and stored for threshold comparison. For example, pixel samples are collected under reflective surface 30 of reflective flag 20 and the average values of all samples are calculated. In one example, the pixel samples average between current and previous scanned lines are compared and it is determined whether the average value exceeds an edge detection threshold value. The edge detection threshold value can be established by calibration or predetermined. If the average value does not exceed the edge detection threshold value established by the image data of the reflective surface 30, the process is started over again with the pixel samples under the reflective surface 30 being collected. When the average value does exceed the edge detection threshold value established by the image data of the reflective surface 30, the leading edge is detected. The medium is moved by ADF 14 along media path 40 to scan position along scan line 42 and the scan of the medium is started.

System 10 is not dependent on the use of a color scan. A mono scan (i.e., grayscale) can be used with system 10. In one example, a mono scan is faster than a color scan, so a faster scan speed is achieved with system 10 when a mono scan is utilized. The mono scan enables full utilization of the scanner speeds. Scroll bar 36 of AFD 14 is positioned along scan line 42. In one example, scroll bar 36 is white. Reflective surface 30 of reflective flag 20 can be the same color or a different color than scroll bar 36. The medium can often have a white background and documents of varied sizes (e.g., legal, letter, etc.) moving across scroll bar 36, in particular when scroll bar 36 and the medium are both white, can be scanned without a loss of scanned content over the width of scroll bar 36 regardless of the medium width.

Figure 4:
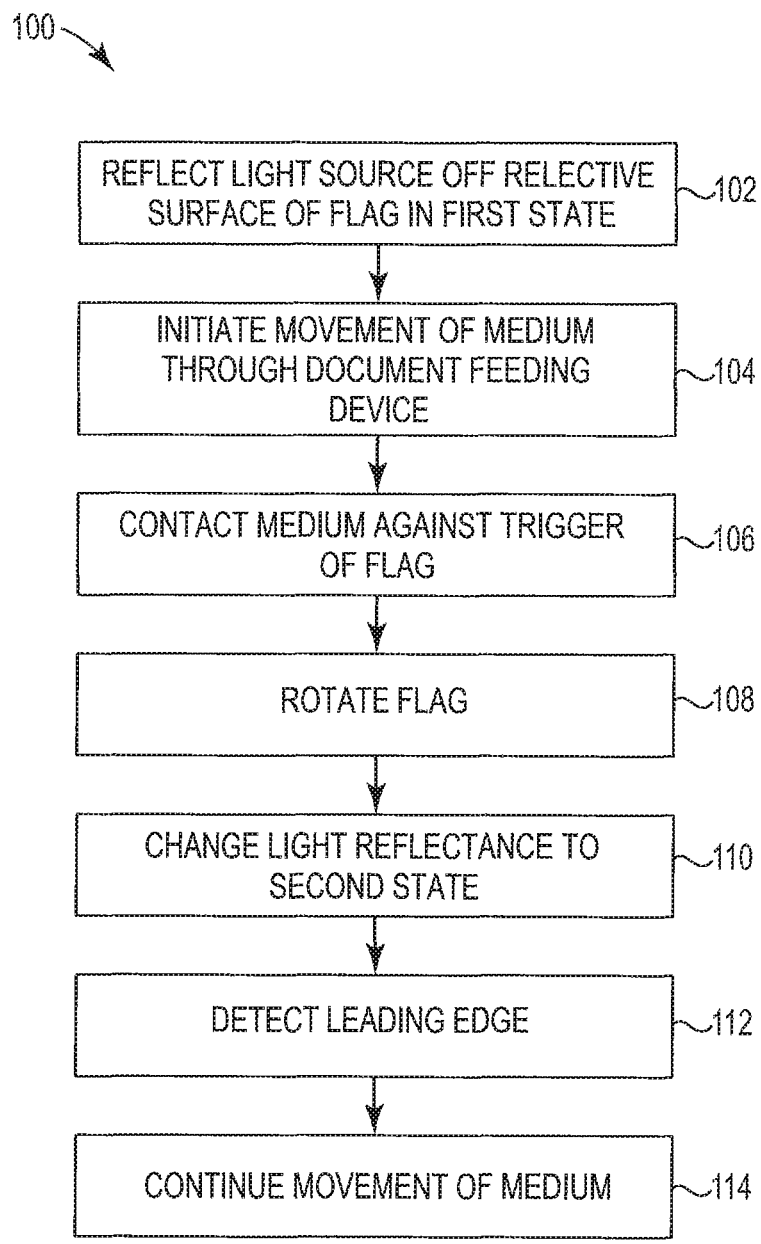
FIG. 4 is a flow chart illustrating an example method for detecting an edge of a document to be scanned with an automatic document feeder system.

FIG. 4 illustrates one example method 100 of document edge detection. At 102, a light source is reflected off a reflective surface of a flag in an optical window of a document feeding device in a first state. At 104, movement of a medium is initiated through the document feeding device. At 106, medium contacts against a trigger of the flag. At 108, the reflective surface of the flag rotates out of the optical window in response to movement of the medium past the trigger. At 110, light reflectance in the optical window is changed to a second state. At 112, a leading edge of the medium is detected in response to the change of state prior to the medium passing into the optical window. At 114, movement of the medium is continued through the document feeding device.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An automatic document feeding system, comprising:
    an image reader including an optical window and a light source illuminating the optical window; and
    an automatic document feeder (ADF) including a reflective flag positioned within a viewing region of the optical window, wherein the reflective flag comprises a reflective surface and a trigger extending into a media path of the ADF, the reflective surface and the trigger on an opposite side of the media path from the optical window, the trigger and the reflective surface arranged at different respective positions with respect to a pivotal axis, and further wherein the reflective surface of the reflective flag is arranged with respect to the image reader to enable calibration of the image reader in a first state, and the reflective surface is to rotate about the pivotal axis in a direction of a media path away from the optical window as the trigger rotates toward the optical window to enable detection of a leading edge of a medium in the media path in a second state.

2. The automatic document feeding system of claim 1, wherein the first state is to comprise a standby state, and the second state is to comprise a state of media presence.

3. The automatic document feeding system of claim 1, wherein detection of the leading edge of the medium is to be based on a change in light reflectance detected by the image reader.

4. The automatic document feeding system of claim 3, wherein the detection of the leading edge is to be based on a light reflectance determined during calibration of the image reader.

5. A method of automatic document feeding, comprising:
    reflecting a light source with a reflective surface of a flag in an optical window of a document feeding device in a first state;
    initiating movement of a medium through the document feeding device;
    contacting the medium against a trigger of the flag;
    rotating the reflective surface of the flag out of the optical window in response to movement of the medium past the trigger;
    changing light reflectance in the optical window to a second state;
    detecting a leading edge of the medium in response to the change of state prior to the medium passing into the optical window; and continuing movement of the medium through the document feeding device.

6. The method of claim 5, comprising:
signaling a scanner to begin scanning a predetermined time after the change to the second state.

7. The method of claim 5, comprising:
scanning the reflective surface to calibrate the light reflectance of the reflective surface.

8. The method of claim 7, comprising:
storing a value of a light reflectance of the reflective surface.

9. The method of claim 8, comprising:
comparing the value of the light reflectance of the reflective surface to other values of light reflectance scanned.

10. The method of claim 5, comprising:
returning the flag to the first state as the trailing edge is moved past the trigger; and
detecting a trailing edge of the medium in response to the return to the first state.

11. A scanning device, comprising:
an automatic document feeder (ADF) to move a medium through the scanning device via a media path, the ADF includes a reflective flag, the reflective flag includes a trigger and a reflective surface arranged on the reflective flag to rotate about a pivotal axis of the reflective flag, wherein the trigger and the reflective surface are arranged at different respective positions with respect to the pivotal axis such that rotation of the trigger towards a scan window is to cause the reflective surface to rotate away from the scan window; and
a scanning assembly including an image reader having the scan window,
wherein the reflective flag and the trigger are arranged on an opposite side of the media path from the image reader and the reflective flag is oriented toward the scan window in a first position to enable calibration of the image reader, and to be oriented away from the window in a second position to enable detection of a leading edge of the medium.

12. The scanning device of claim 11, wherein the reflective surface is to be moved from the first position to the second position in response to movement of the medium against the trigger.

13. The scanning device of claim 12, wherein movement of the trigger in response to movement of the medium against the trigger is to cause the reflective flag to transition from the first position to the second position.

14. The scanning device of claim 11, wherein movement of the reflective flag is to signal the scanning assembly to begin scanning.

* * * * *

UNITED STATES PATENT AND TRADEMARK OFFICE
CERTIFICATE OF CORRECTION

PATENT NO. : 10,414,609 B2  
APPLICATION NO. : 15/546758  
DATED : September 17, 2019  
INVENTOR(S) : Sean BS Lim et al.

Page 1 of 1

It is certified that error appears in the above-identified patent and that said Letters Patent is hereby corrected as shown below:

On the Title Page

In item (72), Inventors, in Column 1, Line 1, delete "Sean B S" and insert -- Sean BS --, therefor.

Signed and Sealed this
Seventeenth Day of March, 2020

Andrei Iancu
*Director of the United States Patent and Trademark Office*